US008112766B2

(12) United States Patent
Regnier et al.

(10) Patent No.: US 8,112,766 B2
(45) Date of Patent: Feb. 7, 2012

(54) MULTI-THREADED DEVICE AND FACILITY MANAGER

(75) Inventors: Alain Regnier, Franconville (FR); Lifen Tian, Sunnyvale, CA (US); Yaotian Wang, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1434 days.

(21) Appl. No.: 11/644,181

(22) Filed: Dec. 21, 2006

(65) Prior Publication Data

US 2008/0155541 A1    Jun. 26, 2008

(51) Int. Cl.
*G06F 9/54* (2006.01)
*G06F 13/00* (2006.01)
*G06F 15/163* (2006.01)
*G06F 3/12* (2006.01)

(52) U.S. Cl. ........ 719/320; 719/313; 709/201; 358/1.15
(58) Field of Classification Search .................... None
See application file for complete search history.

(56) References Cited

U.S. PATENT DOCUMENTS

| | | | |
|---|---|---|---|
| 5,452,452 A | 9/1995 | Gaetner et al. | |
| 5,867,735 A | 2/1999 | Zuravleff et al. | |
| 6,405,310 B1 | 6/2002 | Simpson | |
| 6,421,354 B1 | 7/2002 | Godlewski | |
| 6,449,657 B2 | 9/2002 | Stanbach et al. | |
| 6,483,805 B1 | 11/2002 | Davies et al. | |
| 6,571,277 B1 | 5/2003 | Daniels-Barnes et al. | |
| 6,631,407 B1 | 10/2003 | Mukaiyama et al. | |
| 6,734,985 B1 | 5/2004 | Ochiai | |
| 6,842,898 B1 | 1/2005 | Carlson et al. | |
| 7,072,987 B2 | 7/2006 | Jurisch et al. | |
| 7,127,700 B2 | 10/2006 | Large | |
| 7,191,446 B2 | 3/2007 | Kosanovic | |
| 7,373,422 B1 | 5/2008 | Paul et al. | |
| 7,430,670 B1 | 9/2008 | Horning et al. | |

(Continued)

FOREIGN PATENT DOCUMENTS

EP     1 809 004 A2     7/2007

(Continued)

OTHER PUBLICATIONS

Alexander et al, "Web Services Transfer (WS-Transfer)", Sep. 27, 2006, W3C.*

(Continued)

*Primary Examiner* — Qing Wu
(74) *Attorney, Agent, or Firm* — Hickman Palermo Truong & Becker LLP

(57) ABSTRACT

Techniques are provided for implementing the WS-Device-Profile standard as a multi-threaded process ("DFM") executing on a multi-function peripheral ("MFP"). The DFM takes care of the discovery of devices and services on a network. The DFM also acts as a facility manager. The DFM implements various web services in a single component that applications can re-use. The DFM insulates these applications from some of the more complex details of the web services that the DFM implements. The MFP may comprise several different applications, each with a different specialized function. Each of these applications uses the web services provided by the DFM. The multi-threaded nature of the DFM permits new services to be added to the MFP dynamically. The threads can handle separate tasks concurrently. For example, one thread can handle communications with processes outside the MFP, while another thread can simultaneously handle communications with processes and applications inside the MFP.

24 Claims, 7 Drawing Sheets

U.S. PATENT DOCUMENTS

| | | | |
|---|---|---|---|
| 7,433,873 | B2 | 10/2008 | Kang |
| 7,467,384 | B2 * | 12/2008 | Brubacher et al. ............ 718/104 |
| 7,633,644 | B2 | 12/2009 | Lum et al. |
| 7,765,248 | B2 | 7/2010 | Kanasaki |
| 7,856,638 | B2 | 12/2010 | Kaneda |
| 2002/0129110 | A1 | 9/2002 | Liu et al. |
| 2002/0156872 | A1 | 10/2002 | Brown |
| 2003/0110242 | A1 | 6/2003 | Brown et al. |
| 2003/0187995 | A1 | 10/2003 | Fok et al. |
| 2003/0193685 | A1 | 10/2003 | Kageyama |
| 2003/0225894 | A1 | 12/2003 | Ito |
| 2004/0055002 | A1 | 3/2004 | Das |
| 2004/0111506 | A1 | 6/2004 | Kundu et al. |
| 2004/0111709 | A1 | 6/2004 | Furst et al. |
| 2004/0121789 | A1 | 6/2004 | Lindsey |
| 2004/0143671 | A1 | 7/2004 | Idnani |
| 2004/0226029 | A1 | 11/2004 | Gelme |
| 2004/0236829 | A1 | 11/2004 | Xu et al. |
| 2004/0249911 | A1 | 12/2004 | Alkhatib et al. |
| 2004/0267876 | A1 | 12/2004 | Kakivaya et al. |
| 2005/0021728 | A1 | 1/2005 | Sugimoto |
| 2005/0038708 | A1 | 2/2005 | Wu |
| 2005/0060431 | A1 | 3/2005 | Lewontin |
| 2005/0063003 | A1 | 3/2005 | Mishima et al. |
| 2005/0071507 | A1 | 3/2005 | Ferlitsch |
| 2005/0086330 | A1 | 4/2005 | Perham et al. |
| 2005/0138065 | A1 | 6/2005 | Ciriza |
| 2005/0144218 | A1 | 6/2005 | Heintz |
| 2005/0182843 | A1 | 8/2005 | Reistad et al. |
| 2006/0031395 | A1 | 2/2006 | Kumagawa et al. |
| 2006/0077454 | A1 | 4/2006 | Lum et al. |
| 2006/0095541 | A1 | 5/2006 | Sojian et al. |
| 2006/0117084 | A1 | 6/2006 | Morozumi et al. |
| 2006/0158676 | A1 | 7/2006 | Hamada |
| 2006/0174026 | A1 | 8/2006 | Robinson et al. |
| 2006/0190580 | A1 | 8/2006 | Shu et al. |
| 2006/0256392 | A1 | 11/2006 | Van Hoof et al. |
| 2007/0073865 | A1 | 3/2007 | Motoyama et al. |
| 2007/0083618 | A1 | 4/2007 | Kim |
| 2007/0083679 | A1 | 4/2007 | Kikuchi |
| 2007/0086430 | A1 | 4/2007 | Kemp |
| 2007/0097969 | A1 | 5/2007 | Regnier |
| 2007/0118642 | A1 | 5/2007 | Kumbalimutt |
| 2007/0220142 | A1 | 9/2007 | Moorer et al. |
| 2008/0027988 | A1 | 1/2008 | Regnier |
| 2008/0147886 | A1 | 6/2008 | Ferlitsch |
| 2009/0271501 | A1 | 10/2009 | Shenfield et al. |

FOREIGN PATENT DOCUMENTS

| | | | |
|---|---|---|---|
| KR | | 2004000697 A | 1/2004 |

OTHER PUBLICATIONS

Seely, Scott, "Understanding WS-Security", Oct. 2002, Microsoft Corporation.*
"Web Services Security: SOAP Message Security 1.1 (WS-Security)", Feb. 1, 2006, OASIS.*
European Communication in Application No. 07252034.9 dated Nov. 5, 2010 (11 pages).
D1: Ekanayake, J. et al., "Common Architecture for Functional Extensions on Top of Apache Axis 2" XP002455230, Apr. 24, 2006 (6 pages).
D2: Anonymous, "Axis2 Architecture guide" Internet Article, XP002455231, Apr. 7, 2006 (12 pages).
D3: Buschmann, F. et al., "Pattern-Oriented Software Architecture," XP002455240, 1996 (10 pages).
D4: Ivens, K. et al., "Windows 2000: The Complete Reference" 2000, 15 pages.
Hansen, Jennie, Distributed Largest-First Algorithm for Graph Coloring, Springer-Verlag, Berlin Heidelberg, 2004 8 Pages.
Web Services Policy 1.5-Primer W3C Working Draft Dec. 21, 2006; http://w3.org/TR/ws-policy-primer/ 30 pgs., print date Mar. 6, 2007.
Wright, Don, "The Ubiquity of Print Enabling Printing within the Ubiquitous Web," http://www.w3.org/2006/02/lexmark-paper.pdf, 8 pgs., print date Mar. 6, 2007.
European Patent Office, "Extended European Search Report," App. No. 06255625.3, dated Feb. 27, 2007, 7 pages.
Haring, Dr. Günther, "Systemarchitektur und Dienste für Allgegenwärtige, Kontext-Sensitive Informationsysteme," Endbericht zum Forschungsauftrag des Bundesministeriums fur Verkehr, Innovation und Technologie, Jan. 1, 2003, pp. 1-135, XP 002420364.
Jammes, Francois et al., "Service oriented device communications using the devices profile for Web services", ACM 2005, 8 pages.
Stal, Michael, "Web Services: beyond component-based computing", ACM Oct. 2002, vol. 45, No. 10, pp. 71-76.
The Patent Office of the People's Republic of China, "The First Office Action", application No. 200610137667.1, dated Feb. 6, 2009, 7 pages. (Un-translated OA provided as well, 6 pages).
European Patent Office, "European Search Report", application No. EP 08165235, dated Mar. 25, 2009, 8 pages.
Quiroz, Andres, et al., "Design and Implementation of a Distributed Content-based Notification Broker for WS-Notification", XP-002519356, IEEE, 2006, 8 pages.
Vinoski, Steve, "Web Services Notifications", Toward Integration, XP-002519355, IEEE Computer Society, 2004, 6 pages.
Box, Don, et al., "Web Services Eventing (WS-Eventing)", XP-002519357, Aug. 2004, 38 pages.
U.S. Appl. No. 11/641,453, filed Dec. 18, 2006, Notice of Publication, Jun. 19, 2008.
U.S. Appl. No. 11/641,454, filed Dec. 18, 2006, Notice of Publication, Jun. 19, 2008.
U.S. Appl. No. 11/641,366, filed Dec. 18, 2006, Notice of Publication, Jun. 19, 2008.
U.S. Appl. No. 11/641,510, filed Dec. 18, 2006, Notice of Publication, Jun. 19, 2008.
U.S. Appl. No. 11/641,355, filed Dec. 18, 2006, Notice of Publication, Jun. 19, 2008.
Jammes, F. et al., "Service-Oriented Device Communications Using the *Devices Profile for Web Services*" MPAC (Dec. 2, 2005) 8 pages.
Communication from Application No. 07122381.2-2413 / 1959638 dated Jul. 30, 2008 (7 pages).
"Devices Profile for Web Services" XP-002485806 dated Feb. 2006 (40 pages).
"Management of Hardware Resources in the Datacenter Using Embedded Web Services" XP-002485809 dated May 17, 2006 (8 pages).
U.S. Appl. No. 11/641,366, filed Dec. 18, 2006, Office Action, Jun. 30, 2010.
U.S. Appl. No. 11/641,454, filed Dec. 18, 2006, Final Office Action, Aug. 3, 2010.
Herriot et al., "Internet Printing Protocol (IPP): Event Notifications and Subscriptions", Mar. 2005, Xerox Corp., Request for Comments: 3995, pp. 1-95.
U.S. Appl. No. 11/641,366, filed Dec. 18, 2006, Office Action, Apr. 26, 2011.

* cited by examiner

MULTI-THREADED DEVICE AND FACILITY MANAGER

CROSS-REFERENCE TO RELATED APPLICATIONS

This application is related to the following U.S. Patent Applications and U.S. Patents, the contents of each of which are incorporated by reference for all purposes as though fully disclosed herein: U.S. patent application Ser. No. 11/265,835 (currently abandoned), titled "APPROACH FOR DISCOVERING NETWORK RESOURCES;" U.S. patent application Ser. No. 11/497,000 (issued as U.S. Pat. No. 7,590,661), titled "ADVANCED WEB SERVICES ON A LEGACY PLATFORM;" U.S. patent application Ser. No. 11/641,453 (issued as U.S. Pat. No. 7,987,278), titled "WEB SERVICES DEVICE PROFILE ON A MULTI-SERVICE DEVICE: DYNAMIC ADDITION OF SERVICES," filed Dec. 18, 2006, by Alain Regnier; U.S. patent application Ser. No. 11/641,454 (issued as U.S. Pat. No. 7,873,647, titled "WEB SERVICES DEVICE PROFILE ON A MULTI-SERVICE DEVICE: DEVICE AND FACILITY MANAGER," filed Dec. 18, 2006, by Alain Regnier; U.S. patent application Ser. No. 11/641,366, titled "INTEGRATING EVENTING IN A WEB SERVICE APPLICATION OF A MULTI-FUNCTIONAL PERIPHERAL," filed Dec. 18, 2006, by Alain Regnier, Lifen Tian, and Yao-Tian Wang; U.S. patent application Ser. No. 11/641,510 (issued as U.S. Pat. No. 7,680,877), titled "IMPLEMENTING A WEB SERVICE APPLICATION ON A MULTI-FUNCTIONAL PERIPHERAL WITH MULTIPLE THREADS," filed Dec. 18, 2006, by Alain Regnier, Lifen Tian, and Yao-Tian Wang; and U.S. patent application Ser. No. 11/641,355 (issued as U.S. Pat. No. 7,904,917), titled "PROCESSING FAST AND SLOW SOAP REQUESTS DIFFERENTLY IN A WEB SERVICE APPLICATION OF A MULTI-FUNCTIONAL PERIPHERAL," filed Dec. 18, 2006, by Alain Regnier, Lifen Tian, and Yao-Tian Wang.

FIELD OF THE INVENTION

The present invention relates to providing web services, and more particularly to implementing the WS-DeviceProfile standard as a multi-threaded process executing on a multi-function peripheral ("MFP").

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The World Wide Web ("WWW") is a global, read-write information space. Text documents, images, multimedia and many other items of information, referred to as resources, are identified by short, unique, global identifiers called Uniform Resource Identifiers ("URIs") so that each can be found, accessed and cross-referenced in the simplest possible way. The World Wide Web Consortium ("W3C") is an international consortium where member organization, a full-time staff, and the public work together to develop standards for the World Wide Web. The W3C defines a "web service" as a software system that is designed to support interoperable machine-to-machine interaction over a network. This definition encompasses many different systems, but in common usage, the term refers to those services that use SOAP-formatted Extensible Markup Language ("XML") envelopes and that have their interfaces described by Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define web services are intentionally modular, and, as a result, there is no one document that defines all web services. Instead, there are a few core specifications that are supplemented by other specifications as the circumstances and choice of technology dictate. The most common core specifications are SOAP, WSDL, WS-Security, and WS-ReliableExchange. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows web service interfaces to be described along with the details of those interfaces' bindings to specific protocols. WSDL is typically used to generate server and client code, and for configuration. WS-Security defines how to use XML encryption and XML signature in SOAP to secure message exchanges. WS-ReliableExchange is a protocol for reliable messaging between two web services.

SUMMARY

Embodiments of the invention involve a specific implementation of the WS-DeviceProfile specification. The specific implementation conforms to the WS-DeviceProfile specification. The specific implementation includes a device and facility manager ("DFM") that is not expressly specified in the WS-DeviceProfile specification. The DFM uses various web services (e.g., those specified by WS-Addressing, WS-Discovery, WS-Security, etc.) and describes how to use those web services to perform various tasks. The DFM takes care of the discovery of devices and services on a network. The DFM also acts as a facility manager. The DFM implements various web services in a single component that applications can use and re-use. The DFM insulates these applications from some of the more complex details of the web services that the DFM implements.

In one embodiment of the invention, the DFM is implemented within a multi-function peripheral ("MFP"). The MFP may comprise several different applications, each with a different specialized function (e.g., printing, scanning, faxing, etc.). Each of these applications uses the web services provided by the DFM. Additional applications that are later dynamically added to the MFP also may use the web services provided by the DFM. Because the most commonly used web services are provided by the DFM, these web services do not need to be implemented separately in each application.

In one embodiment of the invention, the DFM is implemented as multiple threads of execution. The multi-threaded nature of the DFM increases efficiency. When the DFM comprises multiple threads, separate threads can handle separate tasks concurrently. For example, one thread can handle communications with processes, applications, and devices outside of the MFP, while another thread can simultaneously handle communications with processes and applications inside of the MFP. Additionally, implementing the DFM in a multi-threaded fashion allows a portion of the DFM's functionality to be temporarily shut down, updated, and/or debugged while the remainder of the DFM remains operational. A thread afflicted by an error may be terminated and restarted while the remaining threads remain unaffected by the error. Thus, the multi-threaded DFM is more robust than a single threaded DFM would be.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
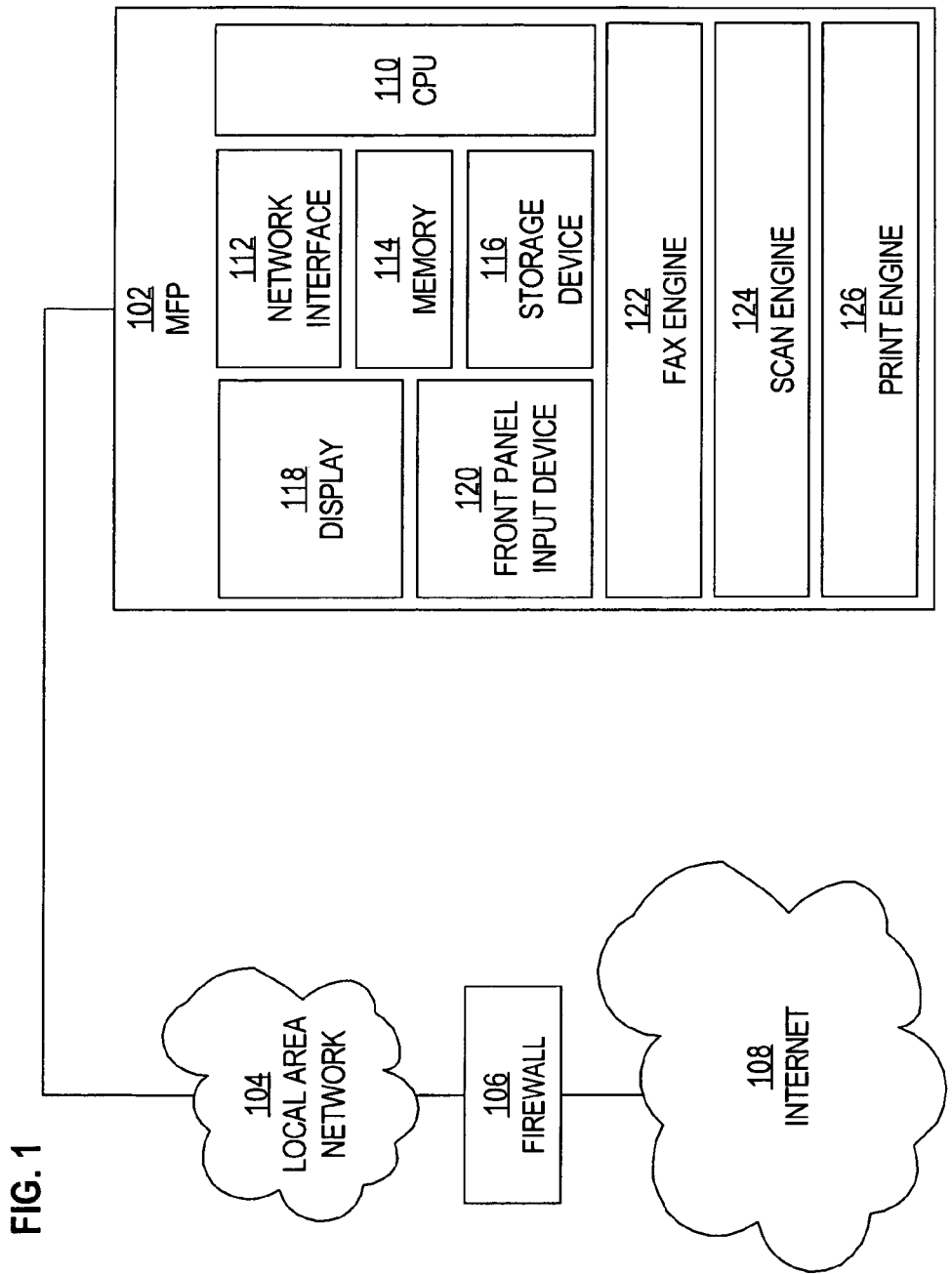
FIG. 1 is a block diagram that illustrates an example of a multi-function peripheral ("MFP") in a network environment, according to an embodiment of the invention.

The description herein is provided in sections organized as follows:

1.0 Architectural Overview
1.1 Client
1.2 Network
1.3 Device Facility Manager
1.4 WSD Manager
   1.4.1 General API
   1.4.2 General API Implementation
1.5 Web Service Application
   1.5.1 Abstract API
   1.5.2 Abstract API Implementation
2.0 Multi-Threaded DFM
3.0 Implementation Mechanisms
1.0 Architectural Overview FIG. 1 is a block diagram that illustrates an example of a multi-function peripheral ("MFP") in a network environment, according to an embodiment of the invention. An MFP is a device that comprises multiple modules for performing multiple different functions. Such functions may include, for example, printing, copying, faxing, scanning, archiving, and document-serving. The Ricoh Aficio Color 5560 is an example of an MFP. This MFP can act as a printer, a scanner, and a copying machine, among other uses. Although various embodiments of the inventions are described in the context of an MFP, embodiments of the invention that include a multi-threaded DFM may be implemented on any image-forming device (e.g., a digital camera).

FIG. 1 shows an MFP 102, a local area network (LAN) 104, a firewall 106, and Internet 108. MFP 102 is coupled communicatively with LAN 104. LAN 104 is coupled communicatively with firewall 106. Firewall 106 is coupled communicatively with Internet 108. Thus, MFP 102 can communicate with other devices via LAN 104, firewall 106, and Internet 108.

MFP 102 comprises multiple different modules, each of which serves a different function. These modules include a central processing unit ("CPU") 110, a network interface (e.g., an Ethernet card) 112, memory (e.g., random access memory ("RAM")) 114, a storage device (e.g., a hard disk drive) 116, a display (e.g., a liquid crystal display) 118, a front panel input device (e.g., a keypad) 120, a fax engine 122, a scan engine 124, and a print engine 126. In various embodiments of the invention, an MFP may comprise more, fewer, or different modules than those illustrated in FIG. 1.

Figure 2:
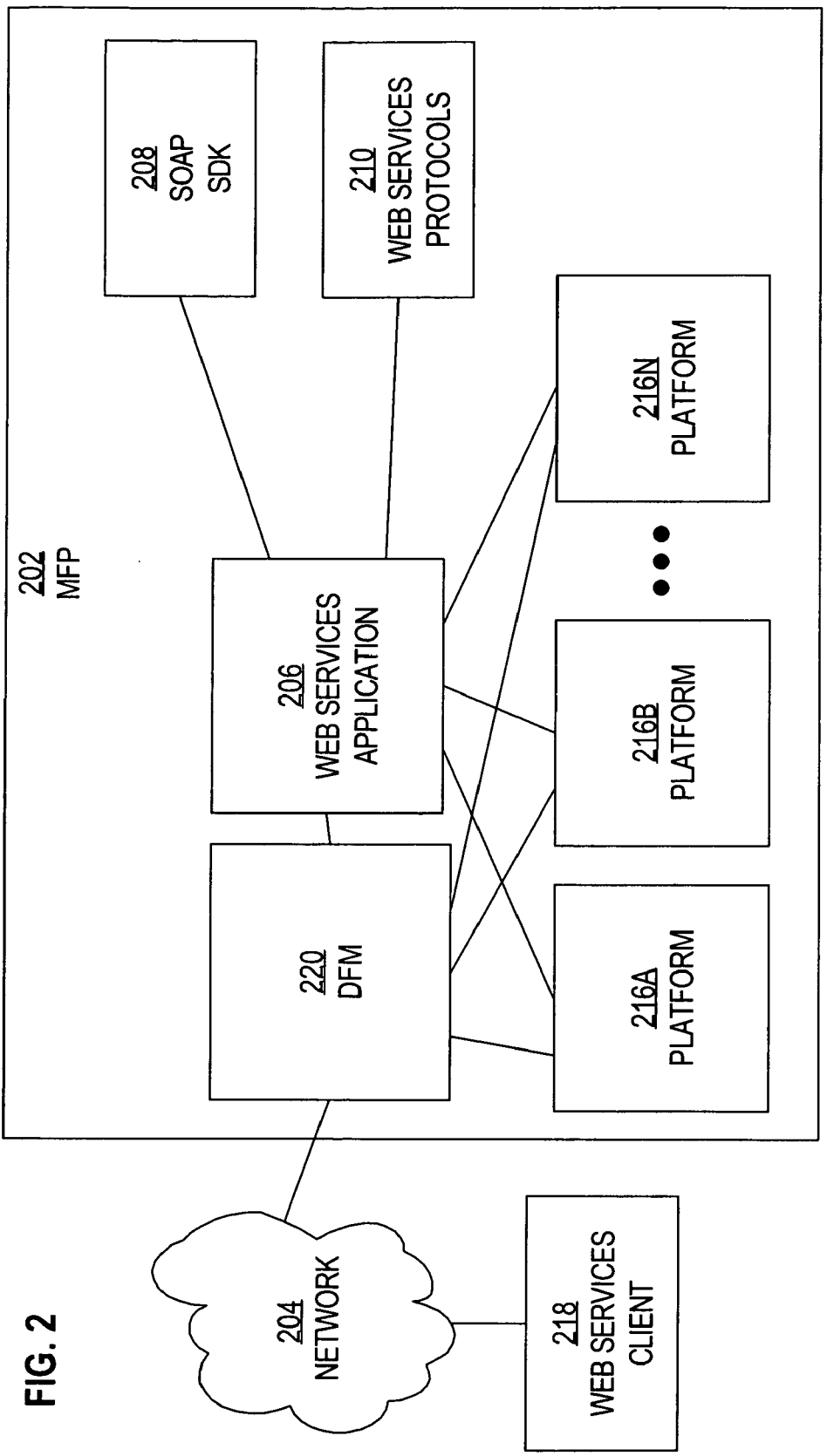
FIG. 2 is a block diagram that illustrates an example of a web services application on an MFP, according to an embodiment of the invention.

FIG. 2 is a block diagram that illustrates a web services application and a DFM on an MFP, according to an embodiment of the invention. FIG. 2 shows an MFP 202 (corresponding to MFP 102 of FIG. 1), a network 204, a web services client 218, and a DFM 220. In one embodiment of the invention, DFM 220 is an implementation of the WS-DeviceProfile specification. MFP 202 and web services client 218 are communicatively coupled to network 204, and communicate with each other thereby.

MFP 202 comprises a web services application 206, which executes on MFP 202. Web services application 206 communicates with web services client 218 via network 204 and DFM 220. MFP 202 further comprises a SOAP software development kit ("SDK") 208 and web services protocols 210. MFP 202 may comprise any of a number of different platforms 216A-216N. Each such platform may be a different operating system and/or a different set of hardware, for example. Although FIG. 2 shows multiple platforms 216A-216N, in one embodiment of the invention, MFP 202 comprises only one platform, which may be any one of platforms 216A-N. Web services application 206 and DFM 220 communicate with platforms 216A-N.

Figure 3:
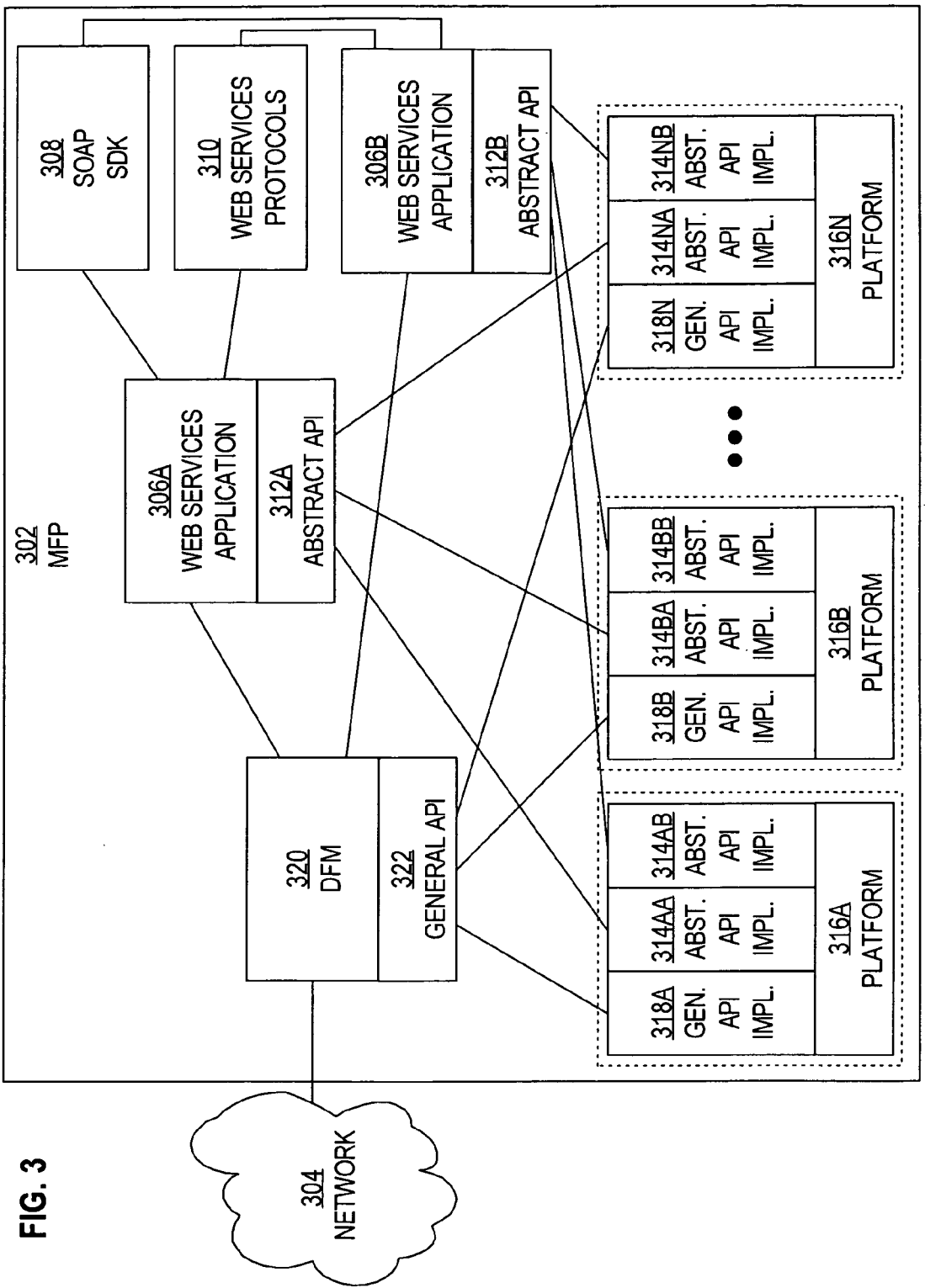
FIG. 3 is a block diagram that illustrates an example of multiple different web services applications and a DFM executing on an MFP, according to an embodiment of the invention.

FIG. 3 is a block diagram that illustrates an example of multiple different web services applications and a DFM executing on an MFP, according to an embodiment of the invention. FIG. 3 shows MFP 302 (corresponding to MFP 202 of FIG. 2) coupled communicatively with network 304. MFP 302 comprises web service application 306A and 306B, each of which may be specialized to handle a specific function of MFP 302. Web service application 306A might be an application that specifically handles printing tasks, while web service application 306B might be an application that specifically handles scanning tasks, for example. Web service applications 306A and 306B are also called "device control protocols" ("DCPs"). MFP 302 also comprises SOAP SDK 308 and web service protocols 310. Web service applications 306A and 308B both use SOAP SDK 308 and web service protocols 310.

MFP 302 may comprise any of a number of different platforms 316A-316N. Each such platform may be a different operating system and/or a different set of hardware, for example. Although FIG. 3 shows multiple platforms 316A-316N, in one embodiment of the invention, MFP 302 comprises only one platform, which may be any one of platforms 316A-N.

For each of platforms 316A-N, there is, for each of web service applications 306A and 306B, a separate API implementation that is specific to that platform and that web service application. Each of abstract API implementations 314AA-NA implements abstract API 312A for a specific platform. Similarly, each of abstract API implementations 314AB-NB implements abstract API 312B for a specific platform. Thus, abstract API implementation 314AA is a platform-specific implementation of abstract API 312A for platform 316A, abstract API implementation 314BA is a platform-specific implementation of abstract API 312A for platform 316B, and so on. Similarly, abstract API implementation 314AB is a platform-specific implementation of abstract API 312B for platform 316A, abstract API implementation 314BB is a platform-specific implementation of abstract API 312B for platform 316B, and so on. Web services application 306A communicates with platforms 316A-N via their corresponding abstract API implementations 314AA-NA, while web services application 306B communicates with platforms 316A-N via their corresponding abstract API implementations 314AB-NB.

MFP 302 also comprises DFM 320, which, in one embodiment of the invention, is an implementation of the WS-DeviceProfile specification. For each of platforms 316A-N, there is a separate general API implementation that is specific to that platform. Each of general API implementations 318A-N implements general API 322 for a specific platform. Thus, general API implementation 318A is a platform-specific implementation of general API 322 for platform 316A, general API implementation 318B is a platform-specific implementation of general API 322 for platform 316B, and so on. DFM 320 communicates with platforms 316A-N via their corresponding general API implementations 318A-N.

Figure 4:
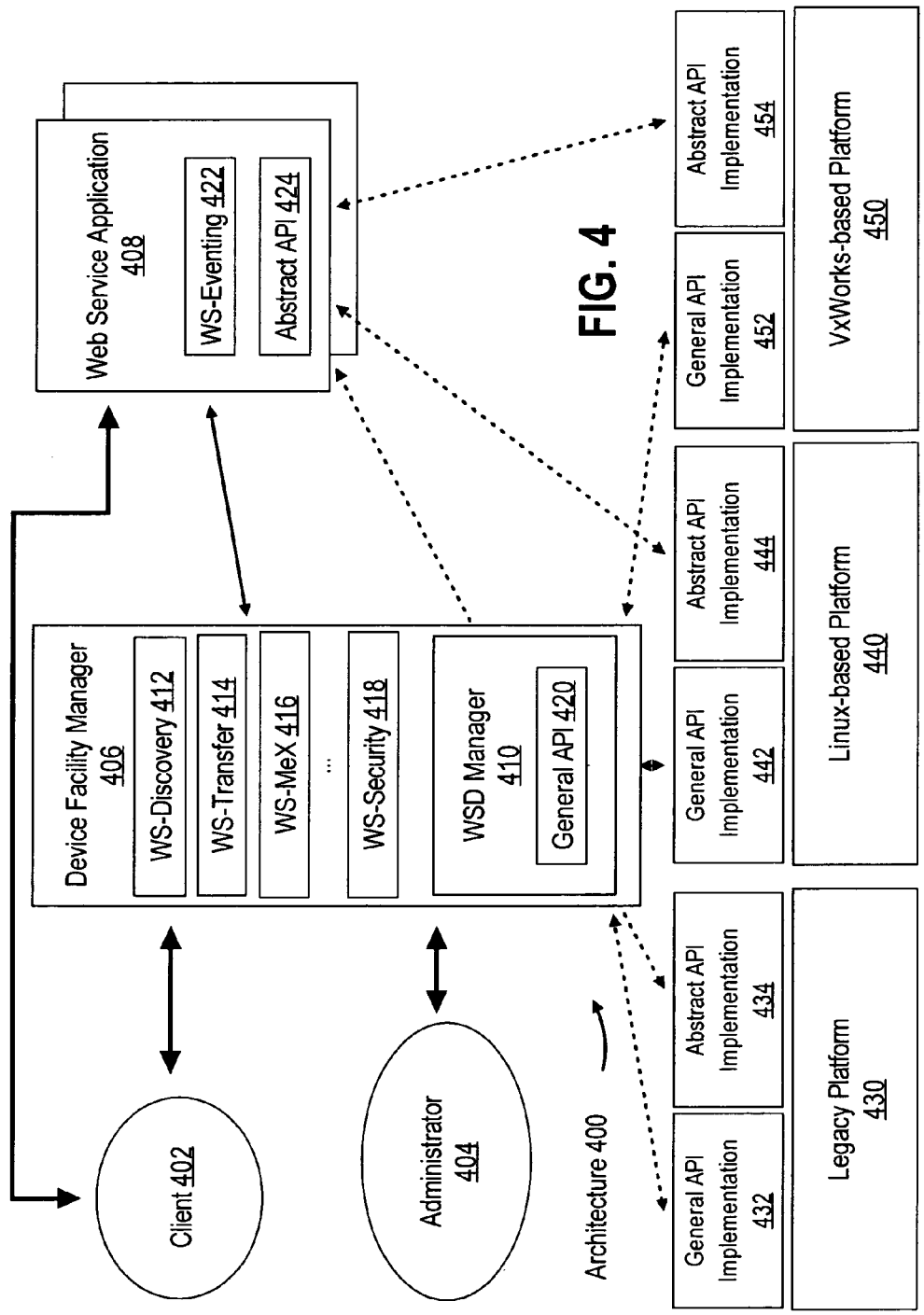
FIG. 4 is a block diagram that illustrates an example architecture of an MFP that comprises a multi-threaded DFM, according to an embodiment of the invention.

FIG. 4 is a block diagram that illustrates an example architecture 400 of an MFP that comprises a multi-threaded DFM, according to an embodiment of the invention. Architecture 400 includes a client 402, an administrator 404, and an MFP that comprises a device facility manager ("DFM") 406 and a plurality of web service applications ("WSAs") 408 executing on the MFP.

The MFP, as indicated by FIG. 4, may comprise any of several platforms (e.g., a legacy platform 430, a Linux-based platform 440, and a VxWorks-based platform 450), upon each of which one or more of the WSAs 408 may execute. The platforms depicted in FIG. 4 are merely provided as examples, as the approach is applicable to any type of platform.

DFM 406 represents the MFP by responding to discovery requests, metadata requests from client 402, and configuration and other MFP administration requests from an administrator 404. DFM 406 may act as a repository of implementations of multiple web service specifications, such as WS-Discovery 412 and WS-MeX (i.e. WS-MetadataExchange) 416.

Client 402 requests services from the MFP. Each WSA 408 executing on the MFP provides a service to client 402 (using the SOAP protocol, for example). Each WSA 408 may employ a service-specific abstract API, such as abstract API 424, independent from the target platform. Each WSA 408 may also employ WS-Eventing 422.

Client 402 discovers that an MFP exists via a discovery request or a discovery HELLO message (i.e., a broadcast or multicast message announcing the MFP to devices on the same network). Once client 402 is aware of the existence of an MFP, client 402 may send a device metadata exchange request (e.g., via WS-MetadataExchange) to discover all the services that the MFP provides. DFM 406, acting for the entire device, receives the request and returns metadata that describes the various services provided by the MFP. Client 402 may request service metadata from a particular web service application executing on the MFP, such as web service application (WSA) 408. WSA 408 may request the service metadata from a web service device (WSD) manager 410, which returns the service metadata to WSA 408. WSA 408 forwards the service metadata to client 402.

Alternatively, the device metadata of the MFP and the service metadata of one or more WSAs may be sent to client 402 in the same response.

Based on the service metadata, client 402 generates and transmits a SOAP request that corresponds to a service provided by WSA 408. WSA 408 receives and processes the SOAP request. Based on a service request, WSA 408 may use an abstract API 424 to make a platform-specific call to an implementation of abstract API 424, such as an abstract API implementation 444. A developer of a web service application (e.g., WSA 408) may focus on the development of the web service itself without having to know the complexities of the underlying platform upon which the web service executes. Therefore, someone with knowledge of the target platform, even other than the web service application developer, may define the implementation of the corresponding abstract API.

1.1 Client

Client 402 is an application that is associated with a process that requests one or more services provided by the MFP. Client 402 is typically an application that is associated with the operating system that supports the initial requesting process. A purpose of client 402 is to convert a platform-specific procedure call from a requesting process into a SOAP request that can be processed by an application that understands SOAP.

For example, the requesting process may be associated with a Microsoft Word application. WSA 408 may provide a print service. Client 402 may be an application that is associated with the operating system that supports the initial requesting process. Client 402 might receive a platform-specific "print data" request that was sent from the requesting process. Client 402 would then encode the print data request into a SOAP message that can be processed by WSA 408.

1.2 Network

SOAP communication between client 402 and the MFP may be made over a network (not shown). The network may be implemented by any medium or mechanism that provides for the exchange of data between various nodes in the network. Examples of such a network include, without limitation, a network such as a Local Area Network (LAN), Wide Area Network (WAN), Ethernet, and/or the Internet, and/or one or more terrestrial, satellite, or wireless links. The network may include a combination of networks such as those described. The network may transmit data according to Transmission Control Protocol (TCP), User Datagram Protocol (UDP), and/or Internet Protocol (IP), for example.

1.3 Device Facility Manager

DFM 406 represents the MFP by accepting discovery requests, requests for logging information, and configuration instructions. According to one embodiment of the invention, DFM 406 also acts as a repository of implementations of multiple web service specifications. Thus, DFM 406 may include a shared library of routines that each implement one or more functions that are defined by one or more web services specifications (e.g., WS-Security and WS-MetadataExchange). In this way, multiple web service specifications may be implemented once and then shared with each of the multiple web service applications (e.g., WSA 408) that execute on the MFP. As a result, developers of web service applications can use and rely on the MFP-implemented web service specification without knowing many details about any of these specifications. Some web service specifications implemented on DFM 406 may include, but are not limited to, WS-Discovery 412, WS-Transfer 414, WS-MeX (i.e. WS-MetadataExchange) 416, and WS-Security 418.

In one embodiment of the invention, DFM 406 includes library routines that correspond to the SOAP protocol. Each SOAP library routine implements one or more functions that are defined by one or more SOAP specifications. The SOAP library routines are used to analyze SOAP requests and package SOAP messages. Multiple versions of the SOAP protocol standard may be supported. Updates to a newer version of a SOAP protocol standard may be performed with little or no modification to WSA 408.

In one embodiment of the invention, DFM 406 sends out broadcast messages to indicate updates to one or more WSAs on the MFP. In one embodiment of the invention, client 402 does not need to subscribe to such an update event. However, in one embodiment of the invention, client 402 registers to receive notifications of updates to one or more WSAs on the MFP. In such an embodiment of the invention, if DFM 406 receives update information that pertains to an update of a particular application, and if client 402 is registered to receive a notification of such an update, then DFM 406 sends, to the client application, a notification of the update.

In one embodiment of the invention, DFM 406 receives update information pertaining to a WSA. For example, WSA 408 may provide a fax service. The MFP might detect that the fax line is disconnected. While the fax service is unavailable, DFM 406 should not respond to future metadata requests with device metadata that indicates that the MFP provides a fax service. Therefore, in response to receiving update information from WSA 408, DFM 406 updates the device and/or service metadata that is associated with WSA 408.

In one embodiment of the invention, DFM 406 receives configuration requests from administrator 404. A configuration request indicates one or more WSAs that are to be configured and/or updated. DFM 406 handles configuration requests and performs, or causes to be performed, the configuration or update instruction on the appropriate WSA. Alternatively, DFM 406 may instruct WSD manager 410 to handle such configuration requests.

In one embodiment of the invention, DFM 406 receives and responds to log requests from administrator 404. DFM 406 retrieves logging information that pertains to one or more WSAs that execute on the MFP. DFM 406 sends the logging information to administrator 404. WSD manager 410 may retrieve and provide the logging information to DFM 406.

1.4 WSD Manager

According to one embodiment of the invention, DFM 406 also comprises WSD manager 410. WSD manager 410 provides a central point for logging information, status inquiries, and external management of the MFP. In one embodiment of the invention, administrator 404 is an application that is configured to retrieve, through WSD manager 410, information that pertains to the MFP. For example, WSD manager 410 may centralize all logging information that comes internally from all WSAs 408 and from the various platforms upon which WSAs 408 are executing. Administrator 404 may also configure, update, or disable a WSA 408 using WSD manager 410.

In one embodiment of the invention, WSD manager 410 maintains overall status information, such as where the MFP is located, which WSAs are installed on the MFP, and whether the WSAs are running properly.

In one embodiment of the invention, WSD manager 410 maintains the metadata for the MFP. In one embodiment of the invention, WSD manager 410 maintains service metadata that pertains to each WSA 408 running on the MFP.

1.4.1 General API

According to one embodiment of the invention, WSD manager 410 retrieves general information that pertains to the MFP, such as the IP address and the model number of the MFP, through general API 420. General API 420 defines an interface by which DFM 406 receives information specific to each platform of the MFP. As a result, a DFM developer is not required to know the details of a specific platform; the DFM developer only needs to know the details of the DFM that the developer is building for an MFP. The dotted lines in FIG. 4 represent API calls from a particular API to the appropriate API implementation.

1.4.2 General API Implementation

If general API 420 has been defined for DFM 406, then a platform-specific implementation of general API 420 is defined. For example, a general API implementation 432 is defined for general API 420 on legacy platform 430. Similarly, a general API implementation 442 is defined for general API 420 on Linux-based platform 440. A general API implementation defines the functions that are specified in a device-specific request and implemented on the MFP. The developer of DFM 406 may define the general API implementation. Alternatively, someone else who has knowledge of the target platform may define the general API implementation.

1.5 Web Service Application

Web services application (WSA) 408 is a module that provides one or more web services and relies on web services protocols and technologies, such as those protocols provided by DFM 406. WSA 408 may also rely on a separate SOAP module (not shown) to analyze SOAP requests if WSA 408 does not include logic for analyzing SOAP requests. As indicated above, the separate SOAP module may be provided by DFM 406 and shared among all WSAs 408.

In one embodiment of the invention, WSA 408 also comprises a WS-Eventing module 422 for responding to event requests from client 402. Client 402 may subscribe to an event that is associated with the service provided by WSA 408. For example, WSA 408 might be a printing application. An event to which client 402 subscribes might be the MFP's completion of a print job. Under such circumstances, upon the event's completion, WSA 408 sends an event message to client 402. The event message indicates that the print job is completed.

1.5.1 Abstract API

WSA 408 may also comprise an abstract API (e.g., abstract API 424) through which device-specific calls may be generated. The abstract API defines an interface by which the associated WSA 408 invokes one or more functions on the MFP. Therefore, the developer of a web service application is not required to know the underlying complexities of the target platform, but only of the new service that the developer aims to provide.

1.5.2 Abstract API Implementation

If an abstract API has been defined by a web service application developer, then an implementation of the abstract API for a specific platform is defined. For example, as shown in FIG. 4, an abstract API implementation 434 is defined for abstract API 424 on legacy platform 430. Similarly, an abstract API implementation 454 is defined for abstract API 424 on VxWorks platform 450. An abstract API implementation defines the functions that are specified in a device-specific request and implemented on the MFP. The developer of the web service application may define the implementation. Alternatively, someone else who has knowledge of the target platform may define the implementation.

2.0 Multi-Threaded DFM

As is discussed above, in one embodiment of the invention, the DFM (e.g., DFM 320) is implemented via multiple concurrently executing threads. In one embodiment of the invention, there are at least four threads, including (1) a WSD manager thread, (2) a WS-Discovery thread, (3) an inside dispatcher thread, and (4) an external request processing thread.

In one embodiment of the invention, when the MFP is powered on, a main thread initializes and starts up multiple components. After the main thread has started up the other threads, the main thread gives control to (or begins acting as) the WSD manager thread. The WSD manager thread monitors the registration and un-registration of web services applications (e.g., web services applications 306A and 306B). The WSD manager thread also monitors any changes that are coming from the MFP via the abstract layer (e.g., general API 322/general API implementation 318A). In response to any such change arising, the WSD manager thread (1) updates a version of device metadata that is stored on the MFP and (2) instructs the WS-Discovery thread to broadcast (e.g., via network 304) the change in the device metadata to other devices that are external to the MFP.

In one embodiment of the invention, the WS-Discovery thread waits for the WSD manager thread's approval to send a "Hello" message. In response to the WS-Discovery thread obtaining such approval from the WSD manager's thread, the WS-Discovery thread broadcasts (e.g., via network 304) a "Hello" message to other devices to indicate the presence of the MFP. After sending such a "Hello" message, the WS-Discovery thread listens for incoming "Probe" and "Resolve" messages. In response to receiving a "Probe" or "Resolve" message, the WS-Discovery thread responds appropriately, as specified by the WS-Discovery specification.

Additionally, in one embodiment of the invention, in response to receiving, from the WSD manager thread, a notification that indicates that the MFP's device metadata has been updated, the WS-Discovery thread broadcasts (e.g., over network 304) the change in the device metadata. For example, the message may indicate to other devices that an additional web service (e.g., printing, scanning, etc.) is now available on the MFP, or that a web service which was previously available on the MFP is now unavailable.

In one embodiment of the invention, the internal dispatcher thread handles message exchanges between DFM 320 and web services applications 306A and 306B, and/or other applications that are executing on the MFP. These messages are composed so that they follow a specified format. The internal dispatcher thread parses received messages. The internal dispatcher thread dispatches these messages to the appropriate component of the DFM. The internal dispatcher thread relays the DFM components' responses to these messages back to the appropriate entities (e.g., web services applications 306A and 306B).

In one embodiment of the invention, the external request processing thread monitors request messages that originate from devices and processes that are external to the MFP. For example, the external request processing thread may monitor messages that web service clients send to the MFP over network 304. Thus, in one embodiment of the invention, the internal dispatcher thread handles only messages that originate within the MFP, while the external request processing thread handles only messages that originate from outside of the MFP. Beneficially, the internal dispatcher and external request processing threads may handle messages concurrently, so that the MFP can react to requests from both within and without in a parallel, rather than a serial, manner. The external message dispatcher thread determines the types of the incoming messages, dispatches the messages to the appropriate DFM components based on the types of those messages, receives responses to the messages from the DFM components to which the messages were dispatched, and sends (e.g. over network 304) the responses to the external entities from which the messages originated.

Beneficially, a multi-threaded DFM allows external requests to be queued and handled on a first-come, first-served basis without impacting the rest of the MFP. Additionally, a multi-threaded DFM allows web services applications to be registered and un-registered with the MFP dynamically, without impacting the other tasks of the DFM. Furthermore, a multi-threaded DFM allows communications with the MFP platform to be handled without putting any restrictions on the work that the DFM is doing. Additionally, a multi-threaded DFM allows one thread to focus on the business logic of the DFM without needing to do anything regarding communications with the MFP platform, the web services applications, or MFP-external entities. From a programmatic point of view, having a multi-threaded DFM makes the DFM more modular, flexible, and robust.

Figure 5:
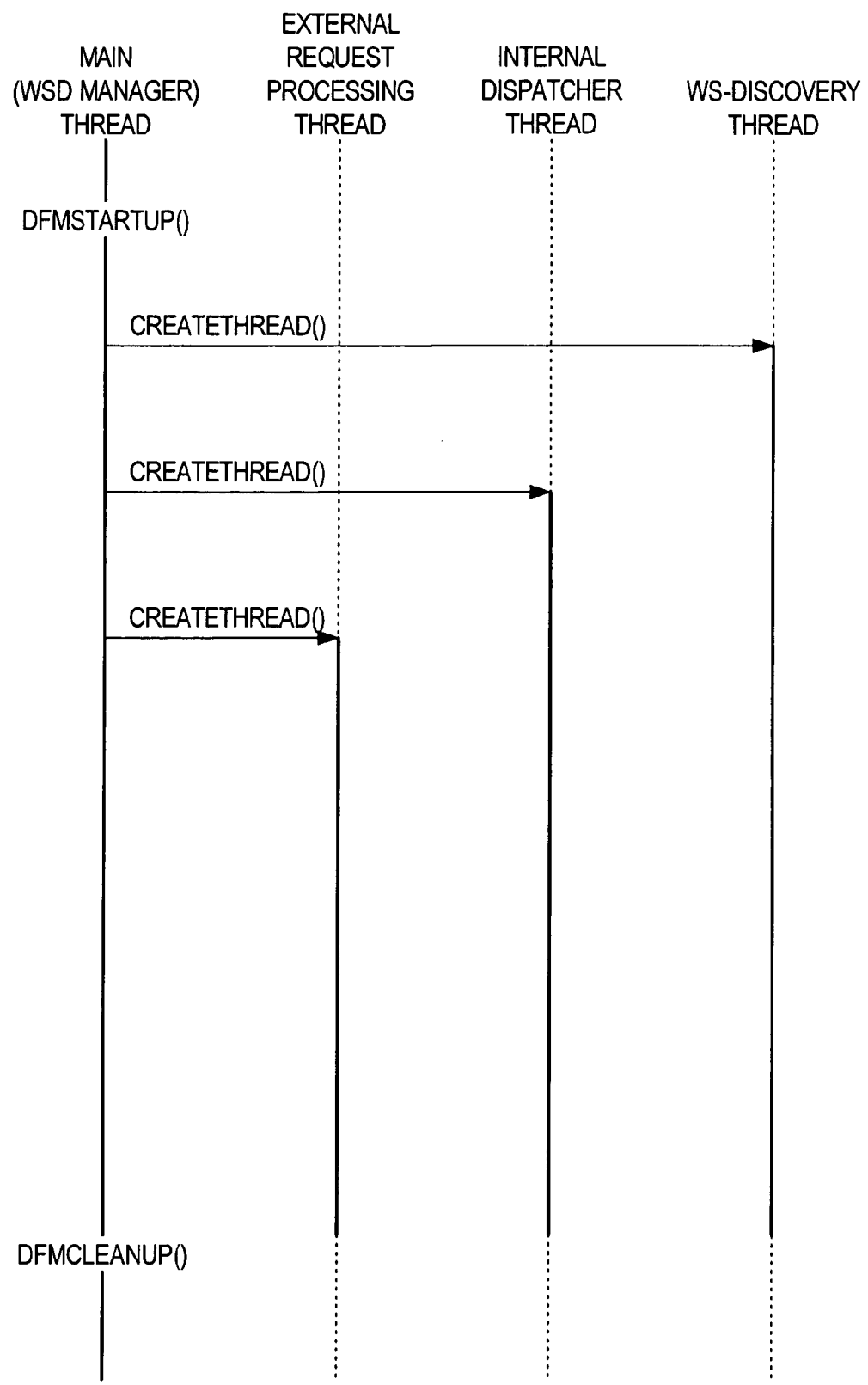
FIG. 5 is a sequence diagram that shows multiple threads of a DFM executing concurrently, according to an embodiment of the invention.

FIG. 5 is a sequence diagram that shows multiple threads of a DFM executing concurrently, according to an embodiment of the invention. A main thread (which may later serve as the WSD manager thread) starts the other threads with invocations of a "CreateThread( )" method, in one embodiment of the invention. The threads created this way include a WS-Discovery thread, an internal dispatcher thread, and an external request processing thread. The WS-Discovery thread implements the WS-Discovery specification and handles discovery requests and responses. The internal dispatcher thread handles communications with entities that are internal to the MFP (e.g., web services applications). The external request processing thread handles (1) the business logic of the DFM and (2) communications with entities that are external to the MFP (e.g., web services clients that access the MFP via a network). In one embodiment of the invention, after creating these other threads, the main thread becomes the WSD manager thread and performs the operations of the WSD manager thread as discussed above (e.g., managing the metadata of the MFP).

Because the external request processing thread is separate from the internal dispatcher thread, the DFM is able to handle communications with MFP-internal and MFP-external entities simultaneously; the DFM does not need to wait for communications with an MFP-internal entity to complete before beginning communications with an MFP-external entity, or vice-versa. Although the embodiment of the invention illustrated includes only four threads, alternative embodiments of the invention may include a greater or lesser number of threads. For example, for each web service application on the MFP, a separate thread could be started to handle communications involving that web service application and no other web service application. However, as the number of threads increases, the overhead required to maintain those threads also increases.

In an alternative embodiment of the invention, there are only two concurrently executing threads: the WS-Discovery thread, which handles all communications specified by the WS-Discovery specification, and another thread which performs operations that are not performed by the WS-Discovery thread.

In one embodiment of the invention, the main thread's invocation of a "DFMCleanUp( )" method causes all of the other threads to shut down in a graceful manner.

Figure 6:
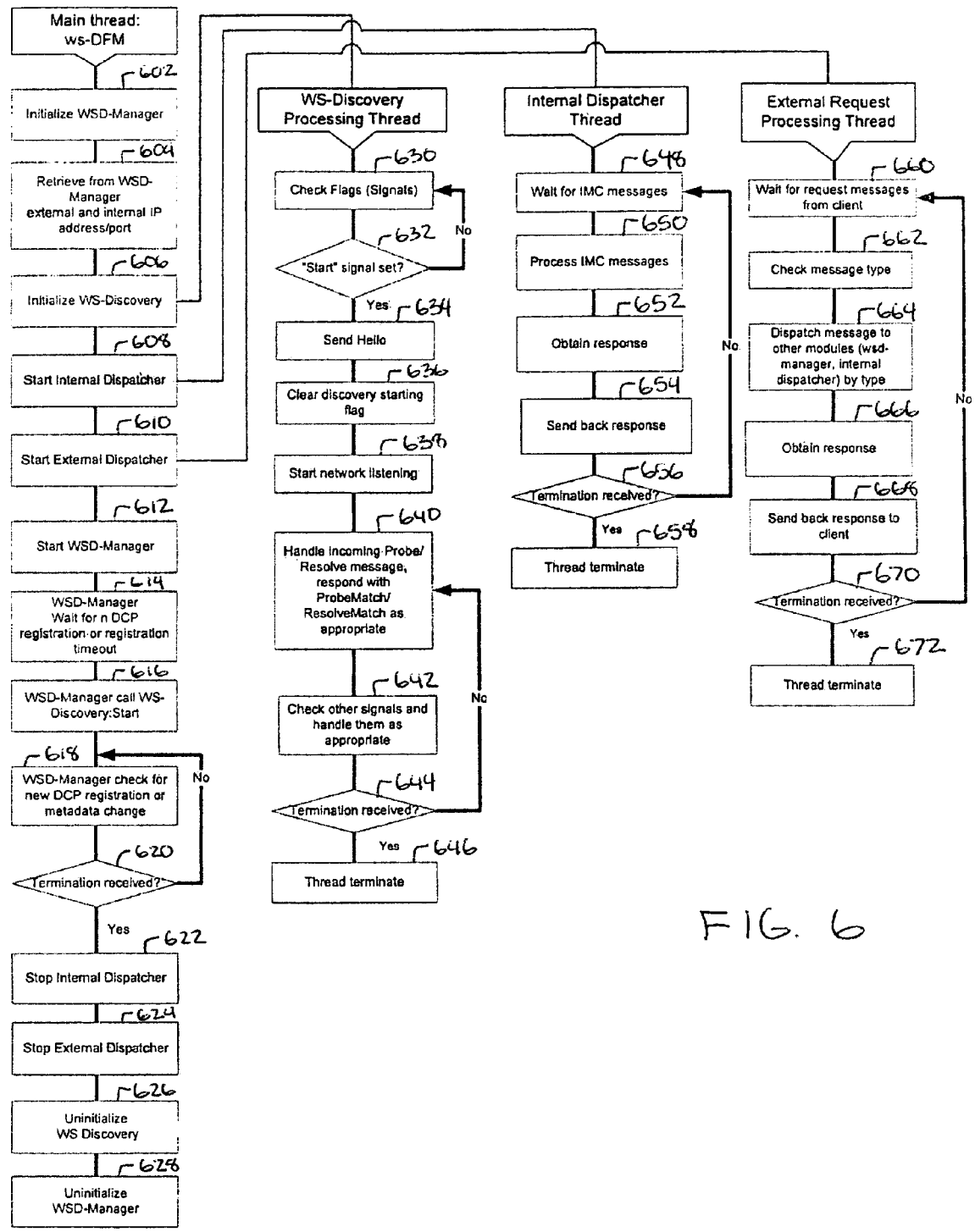
FIG. 6 is a flow diagram that illustrates steps that are performed by several of the concurrently executing threads of a DFM, according to an embodiment of the invention.

FIG. 6 is a flow diagram that illustrates steps that are performed by several of the concurrently executing threads of a DFM, according to an embodiment of the invention. Some of the steps shown in FIG. 6 may be performed concurrently with others of the steps shown in FIG. 6.

Steps 602-628 are performed by the main thread. In block 602, the WSD manager is initialized. In block 604, the external and internal Internet Protocol (IP) address and port are retrieved from the WSD manager. In block 606, the WS-Discovery thread is initialized. The WS-Discovery thread begins to perform steps 630-646 concurrently with steps 602-628 being performed by the main thread. In block 608, the internal dispatcher thread is initialized. The internal dispatcher thread begins to perform steps 648-658 concurrently with steps 602-628 being performed by the main thread. In block 610, the external request processing thread is initialized. The external request processing thread runs concurrently with the main thread and other threads.

In block 612, the WSD manager is started. In block 614, the WSD manager waits for a web service application registration or a registration timeout. In block 616, the WSD manager instructs WS-Discovery to start. In block 618, the WSD manager checks for a new web service application registration or metadata change. In block 620, a determination is made as to whether a termination signal has been received. If a termination signal has been received, then control passes to block 622. Otherwise, control passes back to block 618.

In block 622, the internal dispatcher thread is stopped. In block 624, the external request processing thread is stopped. In block 626, the WS-Discovery thread is un-initialized. In block 628, the WSD manager is uninitialized.

The WS-Discovery thread runs concurrently with the other threads. In block 630, flags (signals) are checked. In block 632, a determination is made as to whether a "start" signal has been set (e.g., by the WSD manager in block 616). If a "start" signal has been set, then control passes to block 634. Otherwise, control passes back to block 630.

In block 634, a "Hello" message is sent. In block 636, a discovery starting flag is cleared. In block 638, the WS-Discovery thread begins listening on the network. In block 640, incoming (e.g., from the network) "Probe" and "Resolve" messages are handled and "ProbeMatch" and "ResolveMatch" messages are sent (e.g., over the network) in response as appropriate. In block 642, other signals are checked and handled as appropriate. In block 644, a determination is made as to whether a termination signal has been received. If a termination signal has been received, then control passes to block 646. Otherwise, control passes back to block 640.

In block 646, the WS-Discovery thread terminates.

The internal dispatcher thread runs concurrently with the main thread and the other threads. In block 648, the internal dispatcher thread waits for inter-module communication ("IMC") messages. IMC messages are communications within the MFP, between the DFM and the WSAs. IMC messages are processed by the internal dispatcher thread. In block 650, IMC messages are processed. In block 652, the internal dispatcher thread obtains one or more responses to one or more IMC messages. In block 654, the internal dispatcher thread sends the one or more responses back to the entities from which the IMC messages were received. In block 656, a determination is made as to whether a termination signal has been received. If a termination signal has been received, then control passes to block 658. Otherwise, control passes back to block 648.

In block 658, the internal dispatcher thread terminates.

The external request processing thread runs concurrently with the main thread and the other threads. In block 660, the external request processing thread waits for request messages from a client (e.g., web services client 218) that is external to the MFP. In block 662, the message type is checked. In block 664, the message is dispatched to other modules or threads (e.g., the WSD manager and/or the internal dispatcher thread) based on the message's type. In block 666, the external dispatcher thread obtains a response to the message from the module or thread to which the message was dispatched. In block 668, the response is sent back to the client from which the message was received. In block 670, a determination is made as to whether a termination signal has been received. If a termination signal has been received, then control passes to block 672. Otherwise, control passes back to block 660.

In block 672, the external request processing thread terminates.

3.0 Implementation Mechanisms

Figure 7:
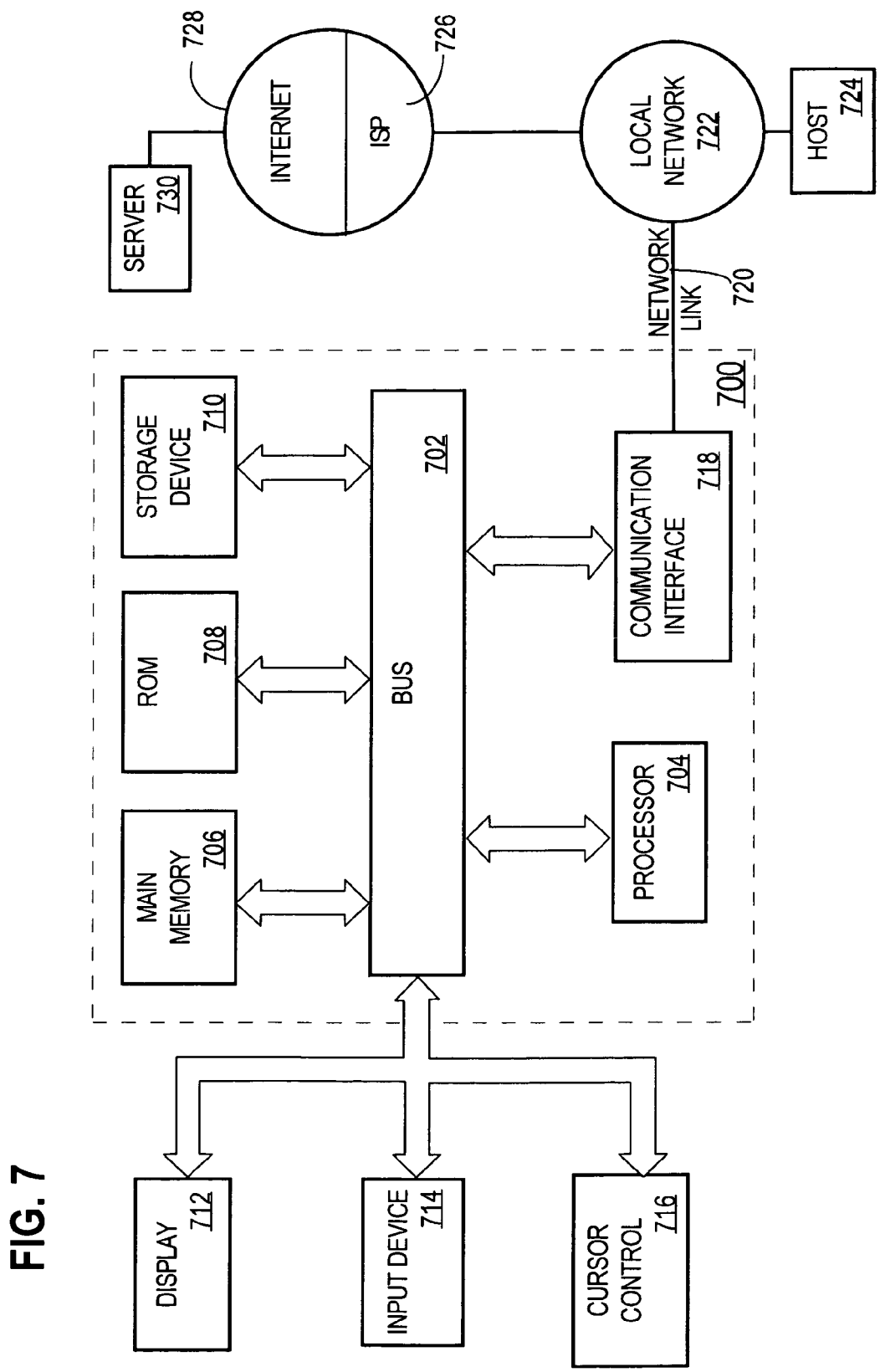
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for implementing a web services device profile specification, the method comprising:
    executing, on a device, a plurality of concurrently executing threads which collectively implement functionality that is specified by the web services device profile specification;
    wherein the device comprises at least two web services applications including at least:
        (a) an image-scanning web services application, (b) a printing web services application, and (c) a fax web services application;
    wherein said plurality of concurrently executing threads are implemented within a device and facility manager that is a repository of implementations of multiple web services specifications including at least one of: (1) WS-Transfer and (2) WS-Security;
    wherein said web services applications utilize said implementations within said repository instead of implementing said web services specifications within said web services applications.

2. The method of claim 1, wherein the device functions as both a copying machine and a printer.

3. The method of claim 1, wherein at least one of the plurality of threads performs only tasks that are specified by the WS-Discovery protocol.

4. The method of claim 1, wherein at least one of the plurality of threads handles communications from processes executing within the device, but does not handle any communications from any processes that execute externally to the device.

5. The method of claim 1, wherein at least one of the plurality of threads handles communications from processes that execute externally to the device and that communicate with the device via a network, but does not handle any communications from any processes executing within the device.

6. The method of claim 1, wherein at least one of the threads handles communications from processes that execute externally to the device while another of the threads handles communicates from processes that execute within the device.

7. The method of claim 1, wherein at least one of the threads (1) detects changes to metadata pertaining to the device and (2) instructs another thread of the plurality of threads to broadcast, over a network, to one or more other devices, update information that indicates changes to the metadata.

8. The method of claim 1, wherein at least one of the threads initializes one or more other threads of the plurality of threads.

9. The method of claim 1, wherein termination of any one of the plurality of threads does not cause any other threads of the plurality of threads to terminate.

10. The method of claim 1, wherein one or more threads of the plurality of threads communicates with messages that are formatted based on Simple Object Access Protocol (SOAP) and Web Services Description Language (WSDL).

11. The method of claim 1, wherein at least one thread of the plurality of threads broadcasts, over a network, information that indicates that a web service that was not previously available on the device is currently available on the device.

12. The method of claim 1, wherein at least one thread of the plurality of threads broadcasts, over a network, information that indicates that a web service that was previously available on the device is no longer available on the device.

13. A non-transitory machine-readable medium carrying instructions which, when processed by one or more processors, cause the one or more processors to perform steps comprising:
   executing, on a device, a plurality of concurrently executing threads which collectively implement functionality that is specified by a web services device profile specification;
   wherein the device comprises at least two web services applications including at least:
      (a) an image-scanning module, (b) a printing module, and (c) a fax module;
   wherein said plurality of concurrently executing threads are implemented within a device and facility manager that is a repository of implementations of multiple web services specifications including at least one of: (1) WS-Transfer and (2) WS-Security;
   wherein said web services applications utilize said implementations within said repository instead of implementing said web services specifications within said web services applications.

14. The non-transitory machine-readable medium of claim 13, wherein the device functions as both a copying machine and a printer.

15. The non-transitory machine-readable medium of claim 13, wherein at least one of the plurality of threads performs only tasks that are specified by the WS-Discovery protocol.

16. The non-transitory machine-readable medium of claim 13, wherein at least one of the plurality of threads handles communications from processes executing within the device, but does not handle any communications from any processes that execute externally to the device.

17. The non-transitory machine-readable medium of claim 13, wherein at least one of the plurality of threads handles communications from processes that execute externally to the device and that communicate with the device via a network, but does not handle any communications from any processes executing within the device.

18. The non-transitory machine-readable medium of claim 13, wherein at least one of the threads handles communications from processes that execute externally to the device while another of the threads handles communicates from processes that execute within the device.

19. The non-transitory machine-readable medium of claim 13, wherein at least one of the threads (1) detects changes to metadata pertaining to the device and (2) instructs another thread of the plurality of threads to broadcast, over a network, to one or more other devices, update information that indicates changes to the metadata.

20. The non-transitory machine-readable medium of claim 13, wherein at least one of the threads initializes one or more other threads of the plurality of threads.

21. The non-transitory machine-readable medium of claim 13, wherein termination of any one of the plurality of threads does not cause any other threads of the plurality of threads to terminate.

22. The non-transitory machine-readable medium of claim 13, wherein one or more threads of the plurality of threads communicates with messages that are formatted based on Simple Object Access Protocol (SOAP) and Web Services Description Language (WSDL).

23. The non-transitory machine-readable medium of claim 13, wherein at least one thread of the plurality of threads broadcasts, over a network, information that indicates that a web service that was not previously available on the device is currently available on the device.

24. The non-transitory machine-readable medium of claim 13, wherein at least one thread of the plurality of threads broadcasts, over a network, information that indicates that a web service that was previously available on the device is no longer available on the device.

* * * * *